(12) United States Patent
Kuroda et al.

(10) Patent No.: US 6,334,970 B1
(45) Date of Patent: Jan. 1, 2002

(54) METHOD FOR PRODUCING FOAMED RESIN ARTICLE

(75) Inventors: Ryuma Kuroda, Ibaraki; Tatsuhiro Nagamatsu, Ichihara, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/363,643

(22) Filed: Jul. 30, 1999

(30) Foreign Application Priority Data

Aug. 3, 1998 (JP) ........................................... 10-218977

(51) Int. Cl.[7] .............................................. B29C 44/20
(52) U.S. Cl. ....................................................... 264/50
(58) Field of Search ........................................... 264/50

(56) References Cited

U.S. PATENT DOCUMENTS 4,424,287 A * 1/1984 Johnson et al. ................ 264/50
5,698,144 A * 12/1997 Wilkes et al. .................. 264/50
5,904,098 A * 5/1999 Wilkes et al. .................. 264/50

FOREIGN PATENT DOCUMENTS

| JP | 60-31538 | 2/1985 |
| JP | 8-11190 | 1/1996 |
| JP | 10-76560 | 3/1998 |

* cited by examiner

Primary Examiner—Allan R. Kuhns
(74) Attorney, Agent, or Firm—Sughrue Mion, PLLC (57) ABSTRACT

The present invention relates to a method for producing a foamed article by which a foamed article having a high expansion ratio, having uniform fine cells in a high closed cell ratio and capable of being recycled, which is utilizable as heat insulating materials for construction, cushioning materials for wrapping, cushioning floats for ships, floats for sports and leisure and the like, can be obtained readily and safely using a clean inorganic gas as a foaming agent, and to a foamed article obtained by the method. That is, the present invention provides a method for producing a foamed resin article comprising a melting step of feeding a thermoplastic resin into an extruder and heating it to melt, a kneading step of mixing an inorganic gas with the thermoplastic resin in the extruder to produce a kneaded material, and a foaming step of discharging the kneaded material from a mold having a tubular channel mounted to the end of the extruder to form the foamed article.

16 Claims, 5 Drawing Sheets

METHOD FOR PRODUCING FOAMED RESIN ARTICLE

BACKGROUND OF THE INVENTION

1. Field of the Invention

The present invention relates to a method for producing a foamed article by which a foamed article having a high expansion ratio, having uniform fine cells in a high closed cell ratio and capable of being recycled, which is utilizable as heat insulating materials for construction, cushioning materials for wrapping, cushioning floats for ships, floats for sports and leisure and the like, can be obtained readily and safely using a clean inorganic gas as a foaming agent, and to a foamed article obtained by the method.

2. Description of the Related Art

Hitherto, as a method for producing a foamed thermoplastic resin article, there have been known a chemical foaming method in which a heat-decomposable foaming agent is mixed with a thermoplastic resin by kneading, and foaming is performed by heating over the decomposition temperature of the foaming agent, and a gas foaming method in which an organic gas having a boiling point not higher than the softening point of a resin, such as butane, pentane and dichlorodifluoromethane (Freon R-12), or a volatile liquid is supplied into the molten resin under pressure, and then the mixture is discharged to a lower pressure to be foamed.

Among the above-mentioned conventional foaming methods, in the case of using a chemical foaming agent, a foamed article having uniform fine closed cells can be obtained. The foamed article, however, contains decomposition residues of the foaming agent to raise problems of discoloring, generation of smell, deterioration in physical properties, etc.

On the other hand, in the case of the gas foaming method, when a foaming agent is a low boiling organic solvent such as butane and pentane, there is a risk of fire and explosion in the manufacturing process. When the foaming agent is chlorofluorocarbon compounds, there can readily be obtained a foamed article with a high expansion ratio having uniform fine closed cells without any risk of explosion, but there are environmental problems such as destroying the ozone layer. Thus the use of such chlorofluorocarbon compounds is proceeding toward a complete removal.

As methods for solving the foregoing problems, for example, a method in which an inorganic gas, such as carbon dioxide, nitrogen and the air, is mixed with a polypropylene resin, and the mixture is then extruded to foam, as described in Japanese Laid-open Patent Publication No. 60 (1985)-31538.

SUMMARY OF THE INVENTION

However, in the above-mentioned method, especially when intending to obtain a foamed article by discharging from a circular die having a tubular channel, an undesirable apparent defect of many streaks was often observed. When an organic solvent is used, such an apparent defect is not observed, or is slightly observed, and it does not damage commercial values of products. On the contrary, the apparent defect, which seems to occur inherently when the inorganic gas is used, seriously damages the commercial values of the products.

The present invention intends to provide a method by which a foamed thermoplastic resin article not having any apparent defect observed in the aforementioned prior art can be obtained using a inorganic carbon dioxide gas as a foaming agent.

The present inventors have intensively studied to improve the above-mentioned streak-like defect by a production method. As a result, their finding that a foamed article with good appearance can be obtained by taking the following action has accomplished the present invention.

That is, the present invention provides;

1. A method for producing a foamed resin article comprising a melting step of feeding a thermoplastic resin into an extruder and heating it to melt, a kneading step of mixing an inorganic gas with the thermoplastic resin in the extruder to produce a kneaded material, and a foaming step of discharging the kneaded material from a mold having a tubular channel mounted to the end of the extruder to form the foamed article, wherein extrusion molding is carried out within the range where a numeric X, which is defined by the following expression:

$X = 100P + 3.5H$ where a resin feeding pressure of the thermoplastic resin from the extruder to the mold is represented by H (kgf/cm$^2$) and an expansion ratio is represented by P, and the resin feeding pressure H satisfy the following expressions simultaneously:

$780 \leq X \leq 4000$, and $80 \leq H \leq 1000$

2. The method for producing a foamed resin article according to above 1, wherein a numeric Y, which is defined by the following expression:

$Y = 100P + 3.5(H - 10G)$ where the amount of the inorganic gas supplied to 100 g of the thermoplastic resin is represented by G g, satisfies the following expression:

$760 \leq Y \leq 4000$

3. The method for producing a foamed resin article according to above 1 or 2, wherein the shape of the tip (lip) of the mold having a tubular channel satisfies the following expressions simultaneously:

$0.1 \leq L \leq 1$;

$0.1 \leq \tan \theta \leq 6$;

and $5 \leq T \leq 500$ where a lip gap, a taper angle, and a taper land are represented by L (mm), θ, and T (mm), respectively.

4. The method of producing a foamed resin article according to any one of above 1 to 3, wherein, as for the shape of the tip (lip) of the mold having a tubular channel, an angle α which is formed by the center axis of the core of the lip and the taper land satisfies the following expression:

$0.1 \leq \tan \alpha \leq 6$

5. The method for producing a foamed resin article according to any one of above 1 to 4, wherein the inorganic gas is carbon dioxide.

6. The method for producing a foamed resin article according to any one of above 1 to 5, wherein the thermoplastic resin is a propylene-based polymer.
7. The method for producing a foamed resin article according to above 6, wherein the propylene-based polymer is a polymer which is obtained by continuous production comprising polymerizing, in the first stage, monomers mainly composed of propylene to produce a crystalline propylene-based polymer (A) having a limiting viscosity of 5 dl/g or more and successively polymerizing, in the second stage, monomers mainly composed of propylene to produce a crystalline propylene-based polymer (B) having a limiting viscosity of less than 3 dl/g and which is composed of the crystalline propylene-based polymer (A) and the crystalline propylene-based polymer (B) wherein a content of the polymer (A) is in the range of 0.05% by weight or more and less than 35% by weight, a limiting viscosity of the whole polymer is less than 3 dl/g, and Mw/Mn is less than 10.
8. The method for producing a foamed resin article according to claim 7, wherein the propylene-based polymer satisfies the following expression:

$$W_A \geq 400 \times EXP(-0.6[\eta_A])$$

where $[\eta_A]$ (dl/g) is the limiting viscosity of the crystalline propylene-based polymer (A) and $W_A$ (% by weight) is the crystalline propylene-based polymer (A) content in the whole polymer.
9. The method for producing a foamed resin article according to above 7 or 8, wherein, the propylene-based polymer is composed of the crystalline propylene-based polymer (A) and the crystalline propylene-based polymer (B), each of them being a propylene homopolymer, a random copolymer of propylene and 10% by weight or less of ethylene, a random copolymer of propylene and 30% by weight or less of butene, or a random terpolymer of propylene, 10% by weight or less of ethylene and 30% by weight or less of butene.
10. The method for producing a foamed resin article according to any one of above 7 to 9, wherein, as for the propylene-based polymer, the crystalline propylene-based polymer (A) has a limiting viscosity $[\eta_A]$ of 7 dl/g or more.
11. The method for producing a foamed resin article according to any one of above 7 to 10, wherein, as for the propylene-based polymer, the crystalline propylene-based polymer (A) contains ethylene, as a comonomer, in a proportion of 1% by weight or more and 10% by weight or less.
12. The method for producing a foamed resin article according to any one of above 7 to 11, wherein the propylene-based polymer is one produced continuously by a production method wherein a catalyst containing Ti, Mg and halogen as essential components is used, the polymerization rate of the crystalline propylene-based polymer (A) in the first step is 2000 g or more per gram of the catalyst per hour and the polymerization rate of the crystalline propylene-based polymer (B) in the second step is 4000 g or more per gram of the catalyst per hour.
13. A foamed resin article which is obtained by the method of any one of above 1 to 12.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

The resin feeding pressure (H; kgf/cm$^2$) and the expansion ratio (P) are defined and measured as described below.

Resin feeding pressure (H): a resin pressure measured by a pressure gauge mounted to the connecting portion (head) from the end of the extruder to the mold (circular die).

Expansion ratio (P): a ratio obtained by dividing the specific gravity of the raw material (unfoamed material) by the specific gravity of the foamed article determined by a conventional specific gravimeter.

In the case of X<780, the expansion ratio becomes small or a defect of many-steak-like uneven pattern appears in the surface of the foamed article. In the case of X >4000, the apparatus unfavorably has too much load (pressure and torque).

In the case of H<80, a foamed article with a high expansion ratio can not be obtained. In the case of H>1000, the apparatus also has unfavorably much load.

The expansion ratio preferably ranges from 2 to 50. When it is less than 2, the product has characteristics close to those of the resin itself rather than those of a foamed article. When it is more than 50, strength of the foamed article becomes poor.

In the aforementioned method for producing a foamed thermoplastic resin article, it is preferable that a numeric Y, which is defined by the following expression:

$$Y=100P+3.5(H-10G)$$

where the amount of the inorganic gas supplied to 100 g of the thermoplastic resin is represented by G g, satisfies the following expression:

$$760 \leq Y \leq 4000$$

In the case of Y<760, the expansion ratio becomes small or the defect of many-streak-like uneven pattern appears in the surface of the foamed article. In the case of Y>4000, the apparatus unfavorably has too much load (pressure and torque).

In the method of the present invention for producing a foamed thermoplastic resin article, the shape of the tip (lip) of the mold having a tubular channel mounted to the end of the extruder preferably satisfies the following expressions simultaneously:

$$0.1 \leq L \leq 1;$$

$$0.1 \leq \tan\theta \leq 6;$$

and $$5 \leq T \leq 500$$

where a lip gap, a taper angle, and a taper land are represented by L (mm), θ, and T (mm), respectively.

L, θ and T are defined as follows.

As for the mold having a tubular channel, its tip portion is called a lip, which is composed of a cylindrical mold called an inner lip and a pipe-like mold called an outer lip, the inner lip and the outer lip defining the tubular channel therebetween. The lip gap L is the gap lying between the inner lip and the outer lip at the tip of the lip. In the mold having a tubular channel, the channel lying between the position where the gap between the inner lip and the outer lip becomes more than 3 mm and the tip of the lip is defined as a land. In the land, the portion where the surfaces of the inner and outer lips facing the channel form an angle of 4 degrees or more is defined as the taper land T. When, for example, the channel has a curved surface, although the aforementioned angle varies depending upon positions in the channel, such a case is encompassed in the present invention and the maximum value of the angle is defined as θ.

In the case of L<0.1, cells in the foamed article are undesirably liable to break. The cause of this is presumed to be an excessively high shear rate at the lip or an abnormal temperature rise. The case of L>1 is undesirable on the ground that it is difficult to keep high the resin feeding pressure H and it is difficult to achieve the requirements on the ranges of X and H. The more preferable range is $0.2 \leq L \leq 0.5$.

In the case of tan $\theta \leq 0.1$, the defect of the streak-like unevenness often occurs. The case of tan $\theta > 6$ is undesirable on the ground that the resin is liable to stay in the taper land portion and the product tends to have portions with uneven expansion ratios. The more preferable range is $0.15 \leq \tan \theta \leq 2$.

In the range of $T \leq 5$, the defect of the streak-like unevenness often occurs. The case of T>500 is undesirable in view of a facility cost because the apparatus becomes large. The more preferable range is $10 \leq T \leq 50$.

Furthermore, the present invention preferably uses a mold having a tubular channel mounted to the end of the extruder in which the shape of the tip (lip) of the mold satisfies the following expression:

$$0.1 \leq \tan \alpha \leq 6$$

where an angle formed by the center axis of the core of the lip and the inner lip defining the taper land is represented by α.

In the case of tan $\alpha \leq 0.1$, the defect of streak-like unevenness often occurs. The case of tan $\alpha > 6$ is undesirable on the ground that the resin is liable to stay in the taper land portion and the product tends to have portions where the expansion ratio is uneven. The more preferable range is $0.5 \leq \tan \alpha \leq 2$. When, for example, the channel has a curved surface, although the aforementioned angle varies depending upon positions in the channel, such a case is encompassed in the present invention and the maximum value of the angle is defined as α.

The more preferable conditions of the lip are that the taper land is located near the tip of the lip and that the distance M (mm) between the taper land and the tip of the lip satisfies the expression of $0 \leq M \leq 50$, preferably $1 \leq M \leq 20$. When M is more than that value, an undesirable apparent defect of many streaks was often observed.

The inorganic gas to be used in the present invention, which is a foaming agent, is a material which is in a gaseous state at ordinary temperature and ordinary pressure. Particularly preferred is carbon dioxide.

The thermoplastic resin to be used in the present invention as a material from which the foamed article is formed is preferably a propylene-based polymer.

The aforementioned propylene-based polymer is preferably a polymer which is obtained by continuous production comprising polymerizing, in the first stage, monomers mainly composed of propylene to produce a crystalline propylene-based polymer (A) having a limiting viscosity of 5 dl/g or more (hereinafter, sometimes referred to as "polymer (A)") and successively polymerizing, in the second stage, monomers mainly composed of propylene to produce a crystalline propylene-based polymer (B) having a limiting viscosity of less than 3 dl/g (hereinafter, sometimes referred to as "polymer (B)") and which is composed of the crystalline propylene-based polymer (A) and the crystalline propylene-based polymer (B) wherein a content of the polymer (A) is in the range of 0.05% by weight or more and less than 35% by weight, a limiting viscosity of the whole polymer is less than 3 dl/g, and Mw/Mn is less than 10. (Such a propylene-based polymer is sometimes abbreviated to PP-LG.)

The "polymer which is obtained by a continuous production" includes polymers obtained by a batch polymerization method in which, in the same polymerization vessel, the crystalline propylene-based polymer (A) is produced by polymerization, followed by production of the crystalline propylene-based polymer (B) by polymerization, a polymerization method in which the polymerization vessels consisting of at least two vessels are connected in series, and after production of the polymer (A), the product is transferred to the next polymerization vessel, followed by production of the polymer (B) in the polymerization vessel, or the like.

It is particularly preferable that the crystalline propylene-based polymer (B), which is a component of the PP-LG, is a propylene-based polymer obtained by production following the production of the crystalline propylene-based polymer (A). Some mere blends of a crystalline propylene-based polymer having a limiting viscosity of 5 dl/g or more and a propylene-based polymer having a limiting viscosity of less than 3 dl/g can not improve or insufficiently improve their melt strength.

The crystalline propylene-base polymer (A) preferably has a limiting viscosity of 5 dl/g or more. When the limiting viscosity of the polymer (A) is less than 5 dl/g, the propylene-based polymer is inferior in melt strength, and hence the object of the present invention is difficult to be achieved. The limiting viscosity of the polymer is more preferably 6 dl/g or more, still more preferably 7 dl/g or more.

In the continuous polymerization, the limiting viscosity of the polymer (B) can be set in the above range by suitably choosing production conditions of the polymer (B). The limiting viscosity of the polymer (B) can usually be calculated from the limiting viscosities of the final polymer and the polymer (A) under the assumption that additivity of limiting viscosities is established.

The proportion of the crystalline propylene-based polymer (A) in the whole propylene-based polymer is preferably 0.05% by weight or more and less than 35% by weight. When the proportion is less than 0.05% by weight, the melt strength becomes poor. When the proportion is 35% by weight or more, the elongation characteristics become poor. The proportion is more preferably 0.3% by weight or more and 20% by weight or less. The less proportion of the crystalline propylene-based polymer (A) is desirable as long as the polymer (A) satisfies the melt strength requirement. It is also a preferred embodiment for obtaining a propylene-based polymer having a polymer (A) content of 0.3% by weight or more and 20% by weight or less in which a propylene-based polymer having a polymer (A) content of 20% by weight or more and less than 35% by weight is produced first and the proportion of the polymer (A) is adjusted by adding an ingredient corresponding to the polymer (B) in the melting step or the kneading step.

The limiting viscosity of the crystalline propylene-based polymer (B) is preferably less than 3 dl/g. When it is 3 dl/g or more, the limiting viscosity of the whole polymer becomes so high that the polymer may become inferior in fluidity and a problem in workability may be caused. Even if the viscosity of the whole material is adjusted by addition of other ingredients, there occur problems in miscibility and the like.

The limiting viscosity of the whole PP-LG is preferably less than 3 dl/g. When the limiting viscosity is 3 dl/g or more, the fluidity of the whole material may be poor and a problem in workability may occur. The limiting viscosity of the whole PP-LG is more preferably 1 dl/g or more and less than 3 dl/g.

The PP-LG preferably has a ratio of a weight mean molecular weight (Mw) to a number mean molecular weight (Mn) of less than 10. When Mw/Mn is 10 or more, the appearance of the resulting article is sometimes poor, or the elongation characteristics sometimes deteriorate.

From the viewpoint of melt strength, the propylene-based polymer to be used in the present invention preferably satisfies the following expression:

$$W_A \geq 400 \times EXP(-0.6[\eta_A])$$

where $[\eta_A]$ (dl/g) is the limiting viscosity of the crystalline propylene-based polymer (A) and $W_A$ (% by weight) is the crystalline propylene-based polymer (A) content in the whole polymer. When $W_A$ is less than that value, the melt strength is insufficiently improved.

In the present invention, the propylene-based polymer is preferably composed of the crystalline propylene-based polymer (A) and the crystalline propylene-based polymer (B), each of them being a propylene homopolymer, a random copolymer of propylene and 10% by weight or less of ethylene, a random copolymer of propylene and 30% by weight or less of butene, or a random terpolymer of propylene, 10% by weight or less of ethylene and 30% by weight or less of butene. The polymers (A) and (B) may have the same composition.

Especially, the propylene-based polymer preferably has a crystalline propylene-based polymer (A) containing ethylene, as a comonomer, in a proportion of 1% by weight or more and 10% by weight or less.

A polymer which is continuously produced by a production method wherein a catalyst containing Ti, Mg and halogen as essential components is used, the polymerization rate of the crystalline propylene-based polymer (A) in the first stage is 2000 g or more per gram of the catalyst per hour and the polymerization rate of the crystalline propylene-based polymer (B) in the second stage is 4000 g (being twice as much as that in first stage) or more per gram of the catalyst per hour, is particularly preferred as the propylene-based polymer. It is noted that "per gram of the catalyst" herein means one gram of a solid catalyst containing Ti, Mg and halogen as essential components.

Use of the catalyst system and the production method resulting in that the polymerization rate in the polymerization of the crystalline propylene-based polymer (A) is less than 2000 g per gram of the catalyst per hour sometimes results in a decrease in production efficiency, coloring of the polymer due to catalyst residues, a reduction of heat resistance and the like.

The polymerization temperature of the crystalline propylene-based polymer (A) ranges from 20° C. to 150° C., preferably from 35° C. to 95° C.

The polymerization rate of the crystalline propylene-based polymer (B) is preferably adjusted by selecting polymerization conditions so as to be twice or more, more preferably three times or more, as much as the polymerization rate of the crystalline propylene-based polymer (A) per gram of the catalyst per hour. Although the polymerization temperature at this stage may be identical to or different from that of the crystalline propylene-based polymer (A), it ranges from 20° C. to 150° C., preferably from 35° C. to 95° C. When the polymerization rate of the crystalline propylene-based polymer (B) is less than twice the polymerization rate of the crystalline propylene-based polymer (A) per gram of the catalyst per hour, production efficiency is sometimes reduced and the aforementioned ratio of the crystalline propylene-based polymers (A) and (B) sometimes can not be achieved.

The present invention also relates to foamed articles obtained by the aforementioned production methods. The foamed articles have good appearance and are produced using, as a foaming agent, an inorganic gas which has no environmental problems. The foamed articles of the present invention are preferably cut open by a cutting means continuously after forming to form flat sheets.

DETAILED DESCRIPTION OF THE INVENTION

The thermoplastic resin to be used in the present invention is not particularly limited, and examples thereof include polyolefin resins or polystyrene resins such as polyethylene-based polymers, polypropylene-based polymers, polymethyl acrylate, polymethyl methacrylate, polyvinyl chloride, polyvinyl fluoride, ethylene/propylene copolymers, ethylene/ethyl acrylate copolymers, ethylene/propylene/diene copolymers, acrylonitrile/butadiene/styrene copolymers, polystyrene, and copolymers having 50% or more of styrene moieties; polyamide resins such as 6-nylon, 6,6-nylon, and 12-nylon; polyester resins such as polyethylene terephthalate and polybutylene terephthalate; bisphenol A-based polycarbonate resins; and other known thermoplastic resins such as polyphenylene oxides, polyacetals and polyphenylene sulfides. These may be used either alone or in combination of two or more of them. Among these resins, polypropylene-based polymers can enjoy the effect of the present invention particularly effectively.

Examples of the polypropylene-based polymers which are preferable thermoplastic resin in the present invention include a propylene homopolymer, or copolymers of propylene with ethylene, an α-olefin or the like. The α-olefin may be 1-butene, 4-methylpentene-1, 1-octene, 1-hexene and the like. Copolymerization is performed in order to control softness, transparency and the like. A content of monomer units other than propylene is preferably 10% by weight or less for ethylene and 30% by weight or less for other α-olefins.

The polypropylene resins having long branches introduced by low-level electron beam crosslinking as described in Japanese Laid-open Patent Application Publication No. 62 (1987)-121704 can be preferably employed.

The crystalline propylene-based polymer (A), which is a component of the PP-LG, is a polypropylene homopolymer or a copolymer of propylene with ethylene, α-olefin or the like in an amount so as not to lose crystallinity. The α-olefin may be 1-butene, 4-methylpentene-1, 1-octene, 1-hexene and the like. A content of monomer units other than propylene is preferably 10% by weight or less for ethylene and 30% by weight or less for other α-olefins. When the content of the ethylene unit is more than 10% by weight or the content of the other α-olefin unit is more than 30% by weight, crystallinity is reduced and such contents are undesirable for some products. From the viewpoints of softness and transparency, a copolymer of propylene and ethylene containing 1 to 10% by weight of ethylene units is preferred as the crystalline polypropylene-based polymer (A).

A propylene homopolymer, crystalline copolymers of propylene with ethylene, α-olefin or the like, a polymer composed of a crystalline propylene-based polymer in which an amorphous ethylene/α-olefin copolymer is dispersed, and the like can be employed as the crystalline propylene-based polymer (B) as long as they satisfy the condition that the limiting viscosity is less than 3 dl/g.

Examples of preferable crystalline propylene-based polymers (B) include a propylene homopolymer, a random copolymer of propylene and 30% by weight or less of butene, and a random terpolymer of propylene, 10% by weight or less of ethylene and 30% by weight or less of butene. When the contents of monomers other than propylene step across the above bounds, most of crystallinity is lost and some products lose their value.

As regards the catalyst system preferably used in the present invention for producing the propylene-based polymer, the ones described in Japanese Laid-open Patent Application Publication No. 7 (1995)-216017 can be preferably employed. Concrete examples thereof include a catalyst system containing the following (a) to (c):

(a) a trivalent titanium compound-containing solid catalyst component obtained in the following manner: in the presence of an organosilicon compound having a Si-O bond (the preferable one is an alkoxy silane compound represented by the general formula $Si(OR^1)_m(R^2)_{4-m}$, wherein $R^1$ and $R^2$ independently preferably represent a hydrocarbon group having 1 to 20 carbon atoms, "m" is preferably a number satisfying $1 \leq m \leq 4$, and a tetraalkoxy silane compound wherein m=4 is especially preferable) and an ester compound (mono- and polyhydric carboxylic acid esters are used, of which olefin carboxylic acid esters such as methacrylic acid esters and maleic acid esters, and phthalic acid esters are preferable, and diesters of phthalic acid are especially preferable), a titanium compound represented by the general formula $Ti(OR^3)_aX_{4-a}$ (wherein $R^3$ represents a hydrocarbon group having 1 to 20 carbon atoms, X represents a halogen atom, and "a" denotes a number satisfying $0 \leq a \leq 4$, preferably $2 \leq a \leq 4$, and especially preferably a=4) is reduced with an organomagnesium compound (especially, Grignard compounds, dialkyl magnesium compounds, and diaryl magnesium compounds are preferably used) to obtain a solid product. The resulting solid product is treated with an ester compound, followed by a treatment with a mixture of an ether compound (dialkyl ethers are used, of which especially dibutyl ether and diisoamyl ether are preferably used) and titanium tetrachloride, or with a mixture of an ether compound, titanium tetrachloride and an ester compound to yield the trivalent titanium compound-containing solid catalyst;

(b) an organoaluminum compound (triethylaluminum, triisobutylaluminum, a mixture of triethylaluminum and diethylaluminum chloride, tetraethyldialmoxane, and the like are preferably used); and (c) an electron-donative compound (tert-butyl-n-propyldimethoxysilane, tert-butylethyldimethoxysilane, dicyclopentyldimethoxysilane, and the like are preferably used).

As production conditions of the PP-LG, the following conditions are used. That is, for example, the molar ratio of Al atom in the organoaluminum compound (b)/Ti atom in the solid catalyst component (a) is in the range of 1 to 2000, and preferably 5 to 1500, and the molar ratio of the electron-donative compound (c)/Al atom in the organoaluminum compound (b) is in the range of 0.02 to 500, and preferably 0.05 to 50.

As a production method of the propylene-based polymer (A), a solvent polymerization method using an inert solvent typified by a hydrocarbon such as hexane, heptane, octane, decane, cyclohexane, methylcyclohexane, benzene, toluene and xylene, a bulk polymerization method using a liquid monomer as a solvent, and a gas phase polymerization method performed in gaseous monomers can be employed. Among them, the bulk polymerization method and the gas phase polymerization method are preferable because of their easiness of post-treatment.

The polymerization of the crystalline propylene-based propylene-based polymer (B), as described above, conceivably includes the case where the crystalline propylene-based polymer (A) is produced, followed by the production of the crystalline propylene-based polymer (B) in the same polymerization vessel, and the case where the crystalline propylene-based polymer (A) is produced and the crystalline propylene-based polymer (B) is then produced in a different polymerization vessel. Also in the latter case, the solvent polymerization method, the bulk polymerization method, the gas phase polymerization method or the combination thereof can be employed. Especially, the bulk polymerization method, the gas phase polymerization method and the combination thereof are preferable because of their high polymerization activities and easiness of post-treatment.

The PP-LG is subjected to post-treatment such as deactivation of the catalyst, removal of the solvent and unreacted monomers, drying, granulation, and the like, if desired, to be provided as a product to the production method of the present invention.

The PP-LG may contain, if required, various kinds of additives such as, for example, primary and secondary antioxidants, ultraviolet absorbers, antistatic agents, nucleating agents, pigments, foaming aids, fillers, and the like in such a degree as to maintain the effect of the present invention.

A melt index (hereinafter referred to as MFR) of the thermoplastic resin to be used in the present invention is preferably in the range of 1 to 100. When MFR is less than 1, the melt viscosity at the time of foaming becomes so high that it becomes difficult to obtain a foamed article with a high expansion ratio, and in the case of extrusion foaming using an extruder, the load tends to become so high that it becomes difficult for extrusion to be performed. Conversely, when it is more than 100, there is a tendency that viscosity sufficient to withstand a gas expansion pressure during foaming can not be maintained, foams burst and it becomes difficult to obtain a foamed article with a high expansion ratio.

To the thermoplastic resin to be used in the present invention may be added agents for generating nuclears of cells, antistatic agents, fillers, antioxidants, pigments, flame retarders, and the like, if required.

The agent for generating nuclears of cells usually has no particular limitations as long as it has a particle size of 500 μm or less. Examples thereof include calcium carbonate, talc, clay, magnesium oxide, zinc oxide, carbon black, silicon dioxide, titanium oxide, citric acid, sodium bicarbonate, orthoboric acid, talc, and alkaline earth metal salts of fatty acids.

The flame retarder may be at least one compound selected from bromine-containing flame retarders such as hexabromobiphenyl ether and decabromodiphenyl ether, phosphoric acid-based flame retarders such as ammonium polyphosphate, trimethyl phosphate and triethyl phosphate, inorganic flame retarders such as melamine derivatives, aluminum hydroxide, antimony trioxide and magnesium hydroxide, and the like.

Figure 1:
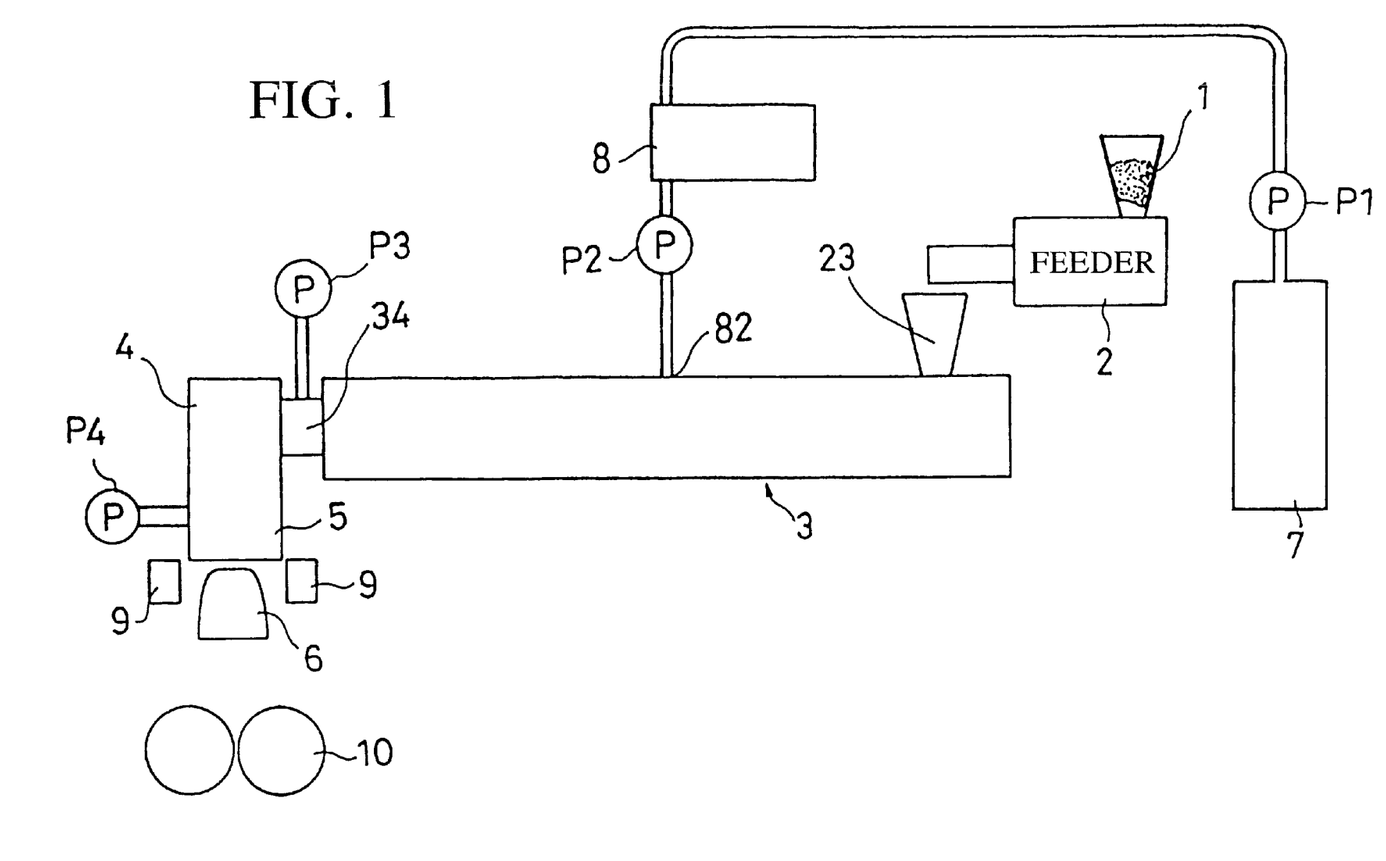
FIG. 1 illustrates an example of the production facilities to be used in the present invention.

The present invention is described below by reference to drawings. FIG. 1 illustrates an example of the method of the present invention for producing a foamed article. A resin composition 1 comprising a thermoplastic resin and additives is first charged into a hopper 23 of an extruder 3 using a feeder 2. The resin composition is melted in the extruder 3 (a melting step), and then an inorganic gas is supplied from a gas cylinder 7 through a gas feeding opening 82, which is provided in the portion where the resin composition is in a molten state, into the molten resin composition by means of a pump 8 and kneaded (a kneading step). The thermoplastic resin which has been kneaded with the inorganic gas is fed into a circular die 4 through a head 34 and then discharged from a lip 5 into the air (a foaming step). The composite of the inorganic gas and the resin composition discharged in a tubular form is hauled along an inner mandrel 6. The inner mandrel 6 is controlled to have a temperature lower than the resin temperature. The resin composition moves on the surface of the inner mandrel 6 with being cooled by it. Another surface of the resin composition is cooled by the wind generated by an air ring 9. The resin composition thus formed in a cylindrical shape is hauled by a haul off machine 10 to yield a foamed sheet of the resin composition.

Figure 2:
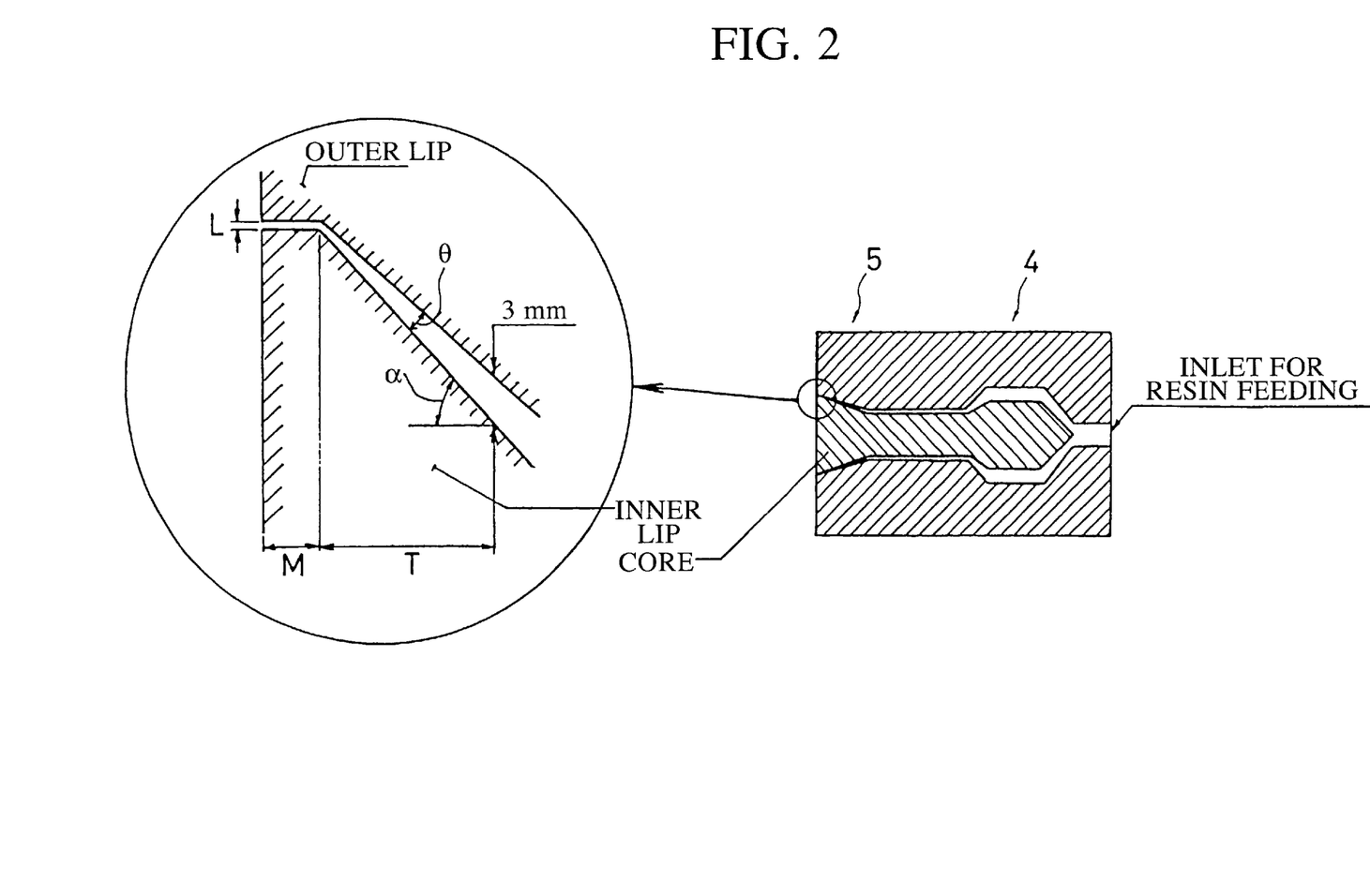
FIG. 2 illustrates a structure of a die to be used in the present invention.
Figure 5:
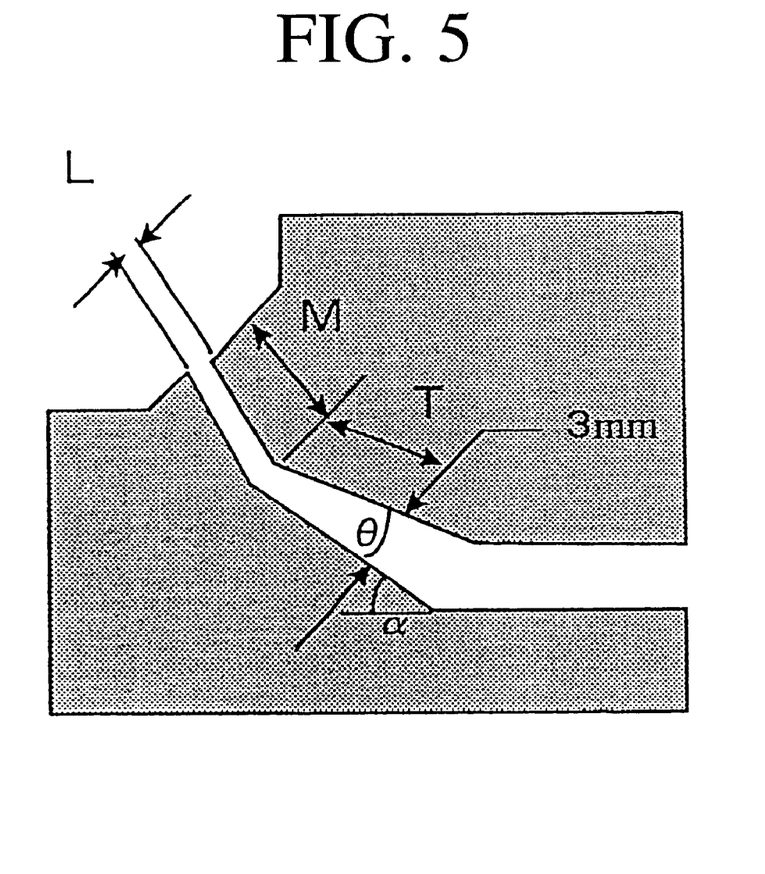
FIG. 5 illustrates an example of the other specific structure of a lip as a part of a die in the present invention. This structure of the lip in FIG. 5 can be used instead of the corresponding part which is shown in an enlarged figure in FIG. 2.

FIG. 2 illustrates an example of the specific shape of the circular die 4, and the lip gap L, the lip land T, the taper angle θ and the angle α which is formed by the center axis of the core and the taper land. M represents length of the portion where the lip portion is parallel with the axis of the circular die. Furthermore, FIG. 5 illustrates an example of the other specific shape of the lip as a part of the circular die 4, and the symbols have the same meanings as described above.

A pressure gauge P1 indicates a gas pressure in the gas cylinder 7. A pressure gauge P2 provides a gas feeding pressure to the gas feeding opening 82. A pressure gauge P3 mounted to the head provides a resin feeding pressure H to the circular die. A pressure gauge P4 indicates a resin pressure at the lip.

The apparatus used in the present invention is an apparatus for producing a foamed article, by which a thermoplastic resin is supplied into an extruder to be melted, an inorganic gas is mixed with the molten material and kneaded in the extruder, and a tubular material, which is obtained by discharging the kneaded material through a mold having a tubular channel mounted to the end of the extruder, is foamed to produce the foamed article.

The mold having a tubular channel has no particular limitations, but a spider-type mold is preferably employed in order to minimize a distribution of a staying time of the resin in the mold.

In the present invention, the inorganic gas, which is used as a foaming agent to be fed into the molten thermoplastic resin in the extruder, may be carbon dioxide gas, nitrogen gas, air, oxygen, neon, argon, hydrogen, and the like. These may be used in admixture of two or more of them. Among them, when the thermoplastic resin is a polyolefin-based resin, carbon dioxide gas having high solubility to the resin or a mixed gas of carbon dioxide and other gas are preferable.

The inorganic gas is preferably added to the thermoplastic resin in the amounts ranging from 0.1 to 20 g to 100 g of the resin. In the case of less than 0.1 g, a formed article with a high expansion resio can not be obtained, and in the case of more than 20 g, there is a tendency that a foamed article with a high expansion ratio can not be obtained or an apparent defect of many streaks occurs. Carbon dioxide is more preferably added to the thermoplastic resin in the amounts ranging from 0.1 to 10 g to 100 g of the resin.

As a method for feeding the inorganic gas into the molten resin composition in the extruder, a method in which an inorganic gas in a gaseous state is fed directly or with being pressurized or depressurized to a predetermined pressure, a method in which an inorganic gas in a liquid state is fed with a plunger pump or the like, a method in which an inorganic gas is fed, using a pressurized hopper, from the hopper side, and the like may be employed.

As for the gas feeding pressure in the case where carbon dioxide gas is employed as the inorganic gas, a pressure at the gas feeding opening of the extruder preferably ranges from 40 to 150 kg/cm$^2$. When the pressure is in this range, the aforementioned suitable amount of the gas dissolved in the thermoplastic resin can be achieved, and also the resin does not scatter from the mold during foaming.

Although the extrusion temperature may vary depending on the type of the thermoplastic resin to be formed, it preferably ranges from (the softening point of the thermoplastic resin −10° C.) to (the softening point +10° C.).

According to the method of the present invention for producing a foamed article, the apparent defect of many uneven streaks which has occurred frequently in the surface of products in the conventional techniques can be avoided by foaming a tubular material using an inorganic gas.

The present invention is described by the following examples which do not limit the scope of the invention.

(1) EVALUATION METHODS

<Expansion Ratio>

As for the foamed articles obtained in the following examples, their specific gravities were determined by using an electronic specific gravimeter (manufactured by Toyo Seiki, Ltd.,) and their expansion ratios were calculated by dividing the previously determined specific gravities by the average of densities of the raw materials (unfoamed materials) (0.900).

The evaluation results were expressed by "○" for cases in which a sample had an expansion ratio of 3 or more, by "Δ" for expansion ratios of 2.5 or more and less than 3, and by "X" for expansion ratios of less than 2.5.

<Appearance>

Appearance of the foamed articles was visually evaluated. When an about 2 mm to 40 mm wide streak-like unevenness was observed, the appearance is expressed by "X (streaks)." Cases in which an irregular unevenness was observed are expressed by "X (uneven)," or by "Δ" according to degree. When no apparent defect as mentioned above was observed, it is expressed by "○,"or by "◎" for very good cases.

<Overall Rating>

When both the expansion ratio and the appearance were "○," the overall rating is expressed by "◎." When at least one of the expansion ratio and the appearance was "X," the overall rating is expressed by "X." When one of the expansion ratio and the appearance was "○" and the other was "Δ," or when the both were "Δ," the overall rating is expressed by "○."

(2) EXAMPLES

Example 1

Figure 4:
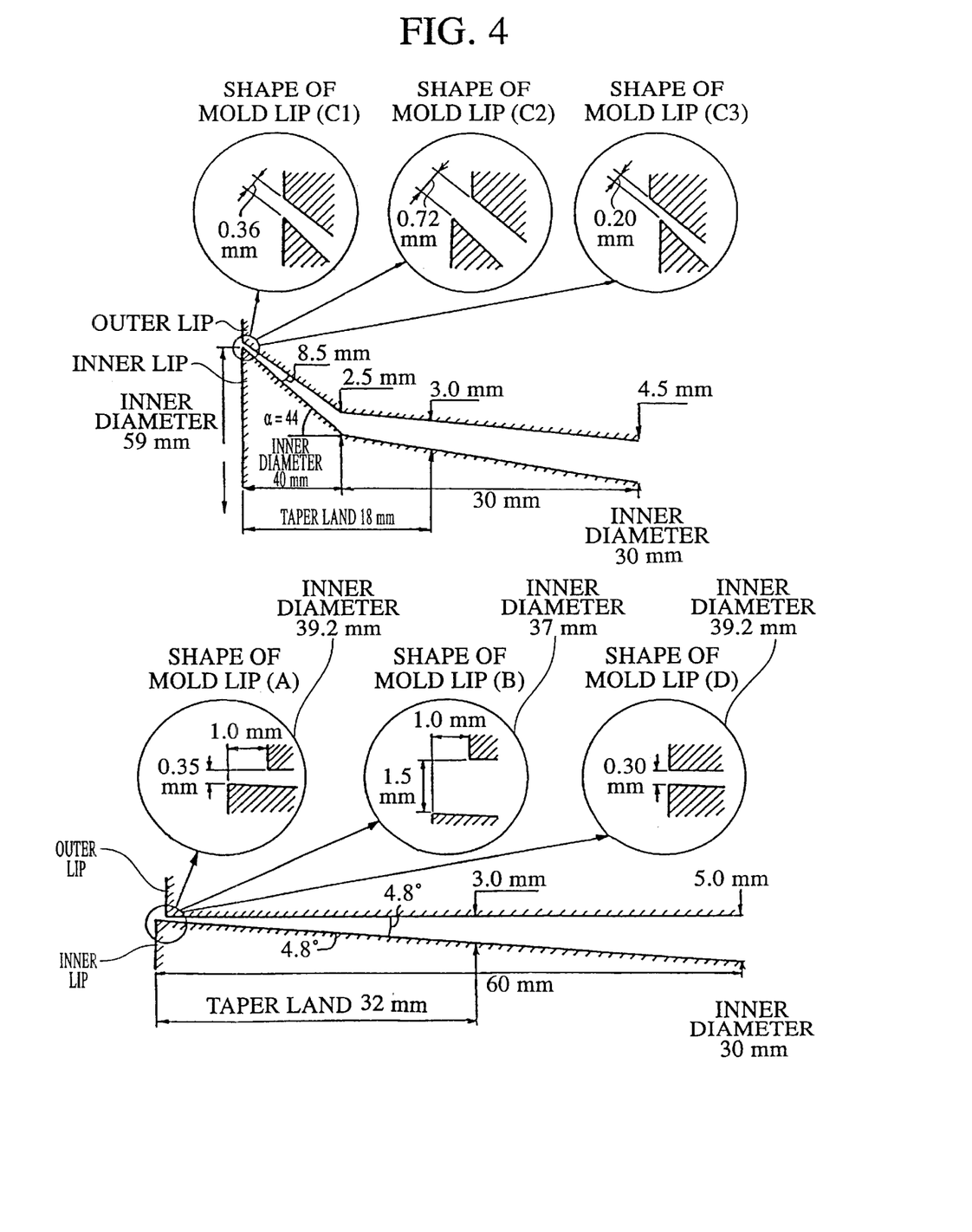
FIG. 4 illustrates the structure of the die used in Examples and Comparative Examples of the present invention and the size of each part of the die.

To 100 parts by weight of a propylene homopolymer (manufactured by Sumitomo Chemical Co., Ltd.; commercial name: W101; MFR=9) in a biaxial extruder (caliber: 40 mm; L/D=30) which was controlled in the temperature as shown in Table 1, 1.5 parts by weight of talc (mean particle diameter of 8 μm) was added from a feeder in a feeding rate of 12.5 kg/hr and carbon dioxide gas was fed at the center of the cylinder of the extruder, and the mixture was kneaded. The feeding condition of the carbon dioxide gas was 0.96 parts by weight to 100 parts by weight of the resin composition, and the gas feeding pressure was 77 kgf/cm$^2$. The kneaded mixture was extruded in a tubular form from a mold (40-mm-caliber circular die) controlled to have different three temperatures as shown in Table 1. The tube was hauled at a hauling rate of 1.4 m/min along an inner mandrel (outer diameter: 100 mm) set at 80° C. to provide a foamed sheet of the resin composition. The lip structure was the model (C1) as illustrated in FIG. 4 (L, tan θ, T, tan α, M, etc. described in this specification are given in Table 1). The resin feeding pressure H to the die was 140 Kgf/cm$^2$, and the expansion ratio of the foamed sheet was 3.1. The sheet had no streak-like apparent defect, and was an article having good appearance. Its overall rating was ∪.

Figure 3:
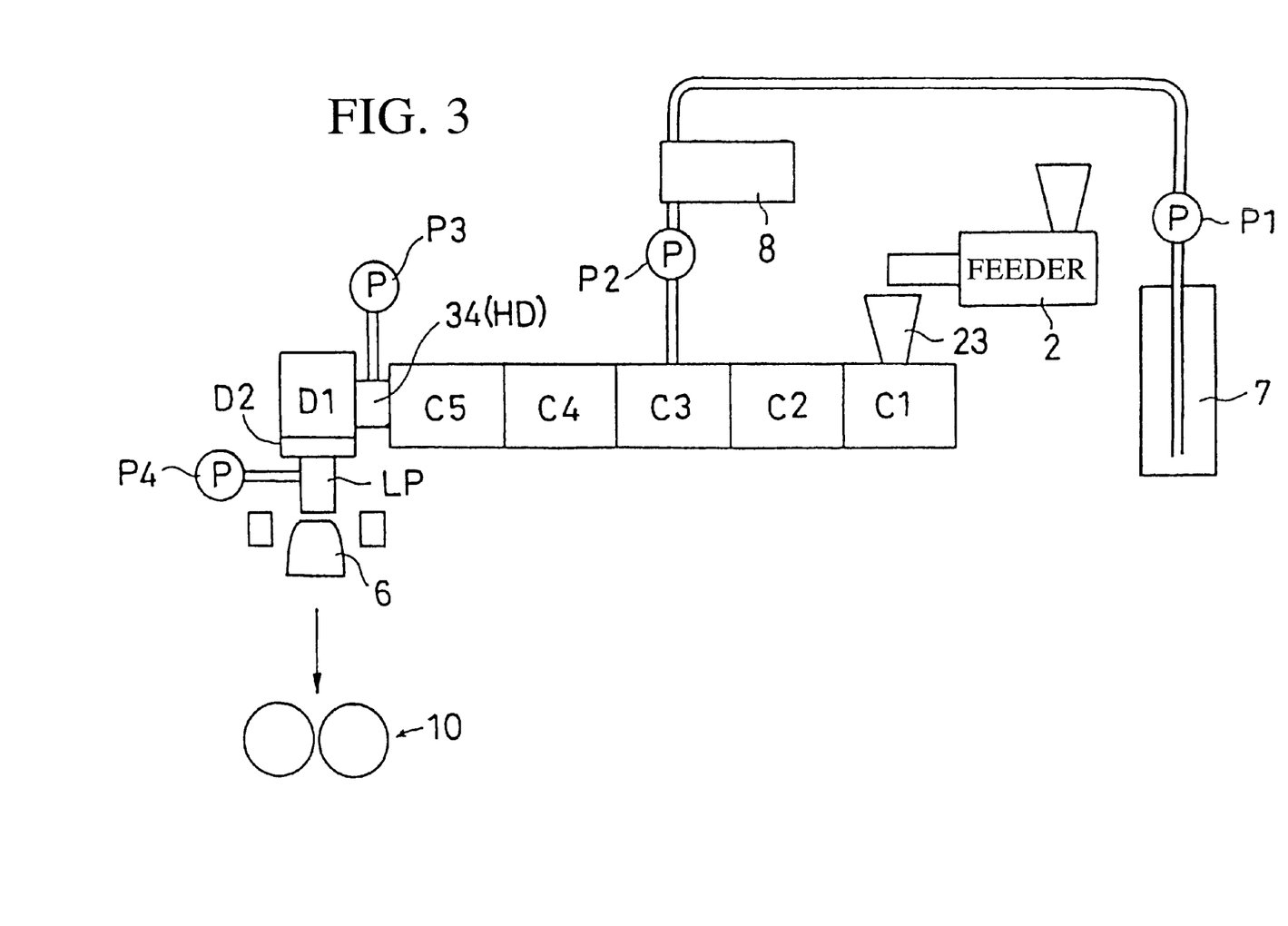
FIG. 3 illustrates the production facilities used in Examples and Comparative Examples of the present invention and points where temperature and pressure were measured.

The set temperature of each portion of the extruder, the point where the resin feeding pressure was detected and the point where the gas feeding pressure was detected were shown in FIG. 3. The shapes and the dimensions of the mold used in Examples 1 to 10 and Comparative Examples 1 to 9 are shown in FIG. 4. The length corresponding to M indicated in FIG. 2 was zero in the all molds used in the Examples and the Comparative Examples.

Comparative Example 1

A foamed sheet of a resin composition was produced in the same manner as Example 1 except that the feeding rate of the resin composition was set to 14.5 kg/hr and the feeding amount of the carbon dioxide gas was set to 1.66 parts by weight to 100 parts by weight of the resin composition. The resin feeding pressure H to the die was 139 Kgf/cm$^2$. The foamed sheet had a streak-like defect and an expansion ratio of 1.7. Its overall rating was X.

Comparative Example 2

A foamed sheet of a resin composition was produced in the same manner as Example 1 except that the feeding rate of the resin composition was set to 13 kg/hr, the feeding amount of the carbon dioxide gas was set to 0.92 parts by weight to 100 parts by weight of the resin composition, and both the temperatures of the head of the extruder and the die (D1) were set to 167° C. The resin feeding pressure H to the die was 126 Kgf/cm$^2$. The foamed sheet had a streak-like defect and an expansion ratio of 2.4. Its overall rating was X.

The conditions and the evaluation results of Examples 1 and Comparative Examples 1 and 2 are given in Table 1.

[TABLE 1]

|  |  |  | Example 1 | Comparative Example 1 | Comparative Example 2 |
|---|---|---|---|---|---|
| Item number of resin used |  |  |  | W101 |  |
| Melt viscosity (MFR) |  |  |  | 8–10 |  |
| Conditions of extruder | Extrusion rate (kg/hr) |  | 12.5 | 14.5 | 13.0 |
|  | Set temperature (° C.) | C1 portion | 145 | 145 | 145 |
|  |  | C2 portion | 175 | 175 | 175 |
|  |  | C3 portion | 175 | 175 | 175 |
|  |  | C4 portion | 170 | 170 | 170 |
|  |  | C5 portion | 168 | 168 | 168 |
|  |  | HD portion | 165 | 165 | 167 |
|  |  | D1 portion | 163 | 163 | 167 |
|  |  | D2 portion | 160 | 160 | 160 |
|  |  | LP portion | 160 | 160 | 160 |
|  | Rotation speed of screw (rpm) |  | 46.0 | 46.1 | 46.3 |
|  | Resin feeding pressure (kgf/cm$^2$) | P3 | 140 | 139 | 126 |
|  |  | P4 | 25 | 25 | 23 |
| Gas feeding conditions | Gas feeding pressure (kgf/cm$^2$) | P1 | 58 | 59 | 59 |
|  |  | P2 | 77 | 103 | 63 |
|  | Gas feeding rate | g/hr | 120 | 240 | 120 |
|  |  | PHR | 0.96 | 1.66 | 0.92 |
| Resin temperature (at exit of mold) (° C.) |  |  | 1.75 | 175 | 175 |
| Shape of mold lip |  | Model (FIG 4) | (C1) | (C1) | (C1) |
|  |  | L(mm) | 0.36 | 0.36 | 0.36 |
|  |  | tan θ | 0.15 | 0.15 | 0.15 |
|  |  | T(mm) | 18 | 18 | 18 |
|  |  | tan α | 0.95 | 0.95 | 0.95 |
| Hauling rate (m/min) |  |  | 1.4 | 1.4 | 1.2 |

[TABLE 1]-continued

|  |  |  | Example 1 | Comparative Example 1 | Comparative Example 2 |
|---|---|---|---|---|---|
| Measured values | Expansion ratio P (average of three points) | | 3.1 | 1.7 | 2.4 |
| | Resin feeding pressure | H (kgf/cm$^2$) | 140 | 139 | 126 |
| | | X | 800 | 657 | 678 |
| | | Y | 783 | 628 | 662 |
| Rating | Expansion ratio | | ○ | ○ | X |
| | Appearance | | | ○ | X(Streaks) | ○ |
| | Overall rating | | ◎ | X | X |

Examples 2 and 3

Foamed sheets of resin compositions were produced in the same manner as Example 1 except that "PF814" manufactured by Montell Co. (MFR=3) was used as a propylene homopolymer, the feeding rates of the resin compositions were set to 7 to 8 kg/hr, and the feeding amounts of carbon dioxide gas, the temperatures of the extruder and the die were changed as shown in Table 1. The foamed sheets had high expansion ratios and good appearance, and their overall ratings were ◎.

Comparative Example 3

A foamed sheet of a resin composition was produced in the same manner as Example 2 except that the feeding rate of the resin composition was set to 6 kg/hr. The foamed sheet had a low expansion ratio and poor appearance, and its overall rating was X.

The conditions and the evaluation results of Examples 2, 3 and Comparative Example 3 are given in Table 2.

[TABLE 2]

|  |  |  | Example 2 | Example 3 | Comparative Example 3 |
|---|---|---|---|---|---|
| Item number of resin used | | | PF814 | | |
| Melt viscosity (MFR) | | | 3 | | |
| Conditions of extruder | Extrusion rate (kg/hr) | | 7.0 | 8.0 | 6.0 |
| | Set temperature (° C.) | C1 portion | 145 | 145 | 145 |
| | | C2 portion | 175 | 175 | 175 |
| | | C3 portion | 165 | 165 | 165 |
| | | C4 portion | 160 | 160 | 160 |
| | | C5 portion | 155 | 155 | 155 |
| | | HD portion | 160 | 160 | 160 |
| | | D1 portion | 165 | 166 | 166 |
| | | D2 portion | 163 | 164 | 164 |
| | | LP portion | 163 | 164 | 164 |
| | Rotation speed of screw (rpm) | | 27.6 | 25.9 | 25.9 |
| | Resin feeding pressure (kgf/cm$^2$) | P3 | 100 | 108 | 78 |
| | | P4 | 23 | 21 | 19 |
| Gas feeding conditions | Gas feeding pressure (kgf/cm$^2$) | P1 | 59 | 58 | 59 |
| | | P2 | 64 | 103 | 64 |
| | Gas feeding rate | g/hr | 90 | 240 | 90 |
| | | PHR | 1.29 | 3.00 | 1.50 |
| Resin temperature (at exit of mold) (° C.) | | | 168 | 168 | 168 |
| Shape of mold lip | | Model (FIG 4) | (C1) | (C1) | (C1) |
| | | L(mm) | 0.36 | 0.36 | 0.36 |
| | | tan θ | 0.15 | 0.15 | 0.15 |
| | | T (mm) | 18 | 18 | 18 |
| | | tan α | 0.95 | 0.95 | 0.95 |
| Hauling rate (m/min) | | | 1.1 | 1.6 | 1.1 |
| Measured values | Expansion ratio P (average of three points) | | 4.5 | 5.9 | 1.7 |
| | Resin feeding pressure | H (kgf/cm$^2$) | 100 | 108 | 78 |
| | | X | 797 | 971 | 443 |
| | | Y | 774 | 919 | 417 |
| Rating | Expansion ratio | | ○ | ○ | X |
| | Appearance | | ○ | ○ | X(uneven) |
| | Overall rating | | ◎ | ◎ | X |

Example 4

A propylene homopolymer was produced by the following synthesizing method.

[Synthesis of Solid Catalyst]

A 200-L reactor equipped with a stirrer, made from stainless steel (SUS) was replaced with nitrogen. Thereafter, 80 L of hexane; 6.55 mole of titanium tetrabutoxide, 2.8 mole of diisobutyl phthalate, and 98.9 mole of tetraethoxysilane were charged therein, resulting in a homogeneous solution. Then, 51 L of butylmagnesium chloride with a concentration of 2.1 mole/L in diisobutyl ether solution was gradually added dropwise over 5 hours while maintaining the temperature in the reactor at 5° C. After the dropping was completed, the mixture was further stirred for 1 hour at room temperature, followed by solid-liquid separation at room temperature. Then, washing with 70 L of toluene was repeated three times. Subsequently, toluene was added so that the slurry concentration becomes 0.2 kg/L, after which 47.6 mole of diisobutyl phthalate was added thereto and a reaction was effected at 95° C. for 30 minutes. After the reaction, solid-liquid separation was carried out, and the resulting solid was washed twice with toluene. Then, 3.13 mole of diisobutyl phthalate, 8.9 mole of dibutyl ether, and 274 mole of titanium tetrachloride were added and a reaction was carried out at 105° C. for three hours. After the reaction was completed, the solid-liquid separation was carried out at the same temperature, and the resulting solid was washed twice with 90 L of toluene at the same temperature. Subsequently, the slurry concentration was adjusted to 0.4 kg/L, after which 8.9 mole of dibutyl ether and 137 mole of titanium tetrachloride were added and a reaction was carried out at 105° C. for one hour. After the reaction was completed, the solid-liquid separation was carried out at the same temperature, and then, washing was conducted with 90 L of toluene three times at the same temperature. Thereafter, washing was further conducted with 70 L of hexane three times, followed by drying under reduced pressure to obtain 11.4 kg of a solid catalyst. The resulting-solid catalyst contained 1.8% by weight of titanium atom, 20.1% by weight of magnesium atom, 8.4% by weight of phthalic acid ester, 0.3% by weight of ethoxy group, and 0.2% by weight of butoxy group, and had a good particle property free from fine powder.

[Pre-Activation of Solid Catalyst]

To an autoclave equipped with a stirrer, with an internal volume of 3 L, made from SUS, 1.5 L of n-hexane sufficiently dehydrated and degassed, 37.5 mmol of triethylaluminum, 3.75 mmol of t-butyl-n-propyldimethoxysilane, and 15 g of the above-described solid catalyst were added. While maintaining the temperature in the autoclave at 5 to 15° C., 15 g of propylene was continuously supplied over 30 minutes to perform pre-activation.

[Production of Crystalline Propylene-Based Polymer (A)]

In a polymerization vessel with an internal volume of 300 L made from SUS, while a liquid propylene was supplied so as to keep the polymerization temperature of 55° C. and the polymerization pressure of 27 kg/cm$^2$G, triethylaluminum, t-butyl-n-propyldimethoxysilane, and the pre-activated solid catalyst were continuously supplied and the propylene polymerization was conducted substantially in the absence of hydrogen. A part of the resulting polymer was sampled and analyzed to be found that its limiting viscosity was 7.8 dl/g. The produced polymer was transferred to the second polymerization vessel without being deactivated.

[Production of Crystalline Propylene-Based Polymer (B)]

In a fluidized bed reactor with an internal volume of 1 m$^3$, equipped with a stirrer, while propylene and hydrogen were supplied so as to keep the polymerization temperature of 80° C., the polymerization pressure of 18 kg/cm$^2$G, and the hydrogen concentration of 3 vol % in the gas-phase, propylene polymerization using the catalyst-containing polymer transferred from the first polymerization vessel was successively continued to obtain a propylene-based polymer. The limiting viscosity of this polymer was 1.9 dl/g.

The weight ratio of polymerized amount in the first polymerization vessel to that in the second polymerization vessel was 6.7:93.3. The limiting viscosity of the polymer (B) was 1.5 dl/g.

[Pelletization of Polymer]

To 100 parts by weight of the polymer particles, 0.1 parts by weight of calcium stearate, 0.05 parts by weight of Irganox 1010 (manufactured by Ciba-Geigy Ltd.) as an antioxidant, and 0.2 parts by weight of Sumilizer BHT (manufactured by Sumitomo Chemical Co., Ltd.) were added and mixed, followed by melt-kneading at 230° C. to obtain pellets with MFR of 7.3. Hereinafter, these pellets are abbreviated as PPN120.

[Expansion Molding]

A foamed sheet of a resin composition was produced in the same manner as Example 1 except that PPN120 was used as a propylene homopolymer and the feeding amount of the resin composition, the feeding amount of carbon dioxide gas, the temperature of the extruder and the die were changed as shown in Table 3. The foamed sheet had a high expansion ratio and good appearance, and its overall rating was ⊚.

Comparative Example 4

A foamed sheet of a resin composition was produced in the same manner as Example 4 except that the feeding amount of the resin composition was changed to 8 kg/hr. The foamed sheet had a streak-like defect and its overall rating was X.

Examples 5 to 7

Foamed sheets of resin compositions were produced in the same manner as Example 1 except that the polymerization conditions were changed, there were used the propylene homopolymers (PPN119, 118, 122+124) having weight ratios of the polymer (A) and the polymer (B) changed as shown in the right column of Table 3 and Table 4, and the feeding amount of the resin compositions, the feeding amount of carbon dioxide gas, and the temperature of the extruder and the die were changed as shown in Tables 3 and 4.

The thermoplastic resins used were as follows:
PPN119:
  Polymer (A) [$\eta_A$]=7.8 dl/g
    Polymerization ratio=6.6%
  Polymer (B) Limiting viscosity=1.7 dl/g
    Polymerization ratio=93.4%
  Total Limiting viscosity=2.1 dl/g
PPN118:
  Polymer (A) [$\eta_A$]=7.8 dl/g
    Polymerization ratio=6.8%
  Polymer (B) Limiting viscosity=1.3 dl/g
    Polymerization ratio=93%
  Total Limiting viscosity=1.7 dl/g
PPN122:
  Polymer (A) [$\eta_A$]=7.3 dl/g
    Polymerization ratio=15.3%
+124
  Polymer (B) Limiting viscosity=1.3 dl/g
    Polymerization ratio=85%
  Total Limiting viscosity=2.2 dl/g
The foamed sheets had high expansion ratios and good appearance, and their overall ratings were ⊚.

Comparative Example 5

A foamed sheet of a resin composition was produced in the same manner as Example 5 except that the feeding amount of the gas into the resin composition was increased. The foamed sheet had a streak-like defect and its overall rating was X.

Comparative Example 6

A foamed sheet of a resin composition was produced in the same manner as Example 6 except that the feeding amount of the resin composition was reduced. The foamed sheet had a streak-like defect and its overall rating was X.

Comparative Example 7

A foamed sheet of a resin composition was produced in about the same manner as Example 7 except that the feeding amount of the gas into the resin composition was increased. The foamed sheet had a streak-like defect and its overall rating was X.

[TABLE 3]

|  |  |  | Example 4 | Comparative Example 4 | Example 5 | Comparative Example 5 |
|---|---|---|---|---|---|---|
| Item number of resin used | | | PPN120 | | PPN119 | |
| Melt viscosity (MFR) | | | 73 | | 4.1 | |
| Conditions of extruder | Extrusion rate (kg/hr) | | 12.5 | 8.0 | 12.0 | 12.0 |
| | Set temperature (° C.) | C1 portion | 145 | 145 | 145 | 145 |
| | | C2 portion | 175 | 175 | 175 | 175 |
| | | C3 portion | 175 | 175 | 175 | 175 |
| | | C4 portion | 170 | 170 | 170 | 170 |
| | | C5 portion | 168 | 168 | 168 | 168 |
| | | HD portion | 165 | 165 | 165 | 165 |
| | | D1 portion | 167 | 167 | 170 | 170 |
| | | D2 portion | 160 | 160 | 160 | 160 |
| | | LP portion | 160 | 160 | 160 | 160 |
| | Rotation speed of screw (rpm) | | 45.1 | 45.1 | 44.4 | 44.1 |
| | Resin feeding pressure (kgf/cm$^2$) | P3 | 180 | 120 | 183 | 135 |
| | | P4 | 30 | 30 | 33 | 30 |
| Gas feeding conditions | Gas feeding pressure (kgf/cm$^2$) | P1 | 55 | 55 | 57 | 57 |
| | | P2 | 101 | 101 | 67 | 77 |
| | Gas feeding rate | g/hr | 360 | 360 | 120 | 360 |
| | | PHR | 2.88 | 4.50 | 1.00 | 3.00 |
| Resin temperature (at exit of mold) (° C.) | | | 178 | 178 | 177 | 177 |
| Shape of mold lip | | Model (FIG 4) | (C1) | (C1) | (C1) | (C1) |
| | | L(mm) | 0.36 | 0.36 | 0.36 | 0.36 |
| | | tan θ | 0.15 | 0.15 | 0.15 | 0.15 |
| | | T(mm) | 18 | 18 | 18 | 18 |
| | | tan θ | 0.95 | 0.95 | 0.96 | 0.95 |
| Hauling rate (m/min) | | | 1.1 | 1.1 | 1.1 | 1.1 |
| Measured values | Expansion ratio P (average of three points) | | 3.2 | 3.2 | 3.0 | 2.9 |
| | Resin feeding pressure | H (kgf/cm$^2$) | 180 | 120 | 183 | 135 |
| | | X | 950 | 740 | 941 | 763 |
| | | Y | 900 | 661 | 923 | 710 |
| Rating | Expansion ratio | | ○ | ○ | ○ | Δ |
| | Appearance | | ○ | X(Streaks) | ○ | X(Streaks) |
| | Overall rating | | ◎ | X | ◎ | X |

[TABLE 4]

|  |  |  | Example 6 | Comparative Example 6 | Example 7 | Comparative Example 7 |
|---|---|---|---|---|---|---|
| Item number of resin used | | | PPN118 | | PPN118 + 124 | |
| Melt viscosity (MFR) | | | 12.7 | | 5.4 | |
| Conditions of extruder | Extrusion rate (kg/hr) | | 12.2 | 12.1 | 11.3 | 11.8 |
| | Set temperature (° C.) | C1 portion | 145 | 145 | 145 | 145 |
| | | C2 portion | 175 | 175 | 175 | 175 |
| | | C3 portion | 175 | 175 | 175 | 175 |
| | | C4 portion | 170 | 170 | 170 | 170 |
| | | C5 portion | 168 | 168 | 168 | 168 |
| | | HD portion | 165 | 165 | 170 | 170 |
| | | D1 portion | 167 | 167 | 168 | 168 |
| | | D2 portion | 160 | 160 | 170 | 170 |
| | | LP portion | 160 | 160 | 170 | 170 |
| | Rotation speed of screw (rpm) | | 46.2 | 46.2 | 45.0 | 44.3 |
| | Resin feeding pressure (kgf/cm$^2$) | P3 | 123 | 110 | 170 | 143 |
| | | P4 | 24 | 24 | 26 | 25 |
| Gas feeding conditions | Gas feeding pressure (kgf/cm$^2$) | P1 | 57 | 57 | 58 | 58 |
| | | P2 | 70 | 70 | 79 | 90 |
| | Gas feeding rate | g/hr | 90 | 90 | 120 | 240 |
| | | PHR | 0.74 | 0.74 | 1.06 | 2.03 |
| Resin temperature (at exit of mold) (° C.) | | | 174 | 174 | 176 | 176 |
| Shape of mold lip | | Model (FIG 4) | (C1) | (C1) | (C1) | (C1) |
| | | L(mm) | 0.36 | 0.36 | 0.36 | 0.36 |

[TABLE 4]-continued

|  |  |  | Example 6 | Comparative Example 6 | Example 7 | Comparative Example 7 |
|---|---|---|---|---|---|---|
|  |  | tan θ | 0.15 | 0.15 | 0.15 | 0.15 |
|  |  | T(mm) | 18 | 18 | 18 | 18 |
|  |  | tan θ | 0.95 | 0.95 | 0.96 | 0.95 |
| Hauling rate (m/min) |  |  | 1.6 | 1.6 | 1.2 | 1.2 |
| Measured values | Expansion ratio P (average of three points) |  | 3.5 | 3.5 | 3.8 | 2.7 |
|  | Resin feeding pressure | H (kgf/cm$^2$) | 123 | 110 | 170 | 143 |
|  |  | X | 781 | 735 | 975 | 771 |
|  |  | Y | 768 | 722 | 956 | 742 |
| Rating | Expansion ratio |  | ○ | ○ | ○ | Δ |
|  | Appearance |  | ○ | X(Streaks) | ○ | X(Streaks) |
|  | Overall rating |  | ⊚ | X | ⊚ | X |

Examples 8, 9 and 10

Foamed sheets of resin compositions were produced in approximately the same manner as Example 1 except that the lip structure was changed as shown in Table 5. Although the foamed sheets had some streak-like defects, they were in approximately good conditions and their overall ratings were ○.

Comparative Examples 8 and 9

Foamed sheets of resin compositions were produced in approximately the same manner as Example 1 except that the lip structure was changed as shown in Table 5. The foamed sheets were reduced in the expansion ratio and their overall ratings were X.

As is recognized from Examples 1 to 10, when the resin feeding pressure H, the values X and Y fall within the following ranges:

$$780 \leq X \leq 4000$$
$$80 \leq H \leq 1000$$
$$760 \leq Y \leq 4000$$

the expansion ratio is high and the appearance is good. As is recognized from Comparative Examples 1 to 9, when those values are out of the above ranges, the expansion ratio is low or the appearance is poor.

EXPLANATIONS OF LETTERS AND NUMERALS

1 Thermoplastic resin
2 Feeder

[TABLE 5]

|  |  |  |  | Example 8 | Example 9 | Example 10 | Comparative Example 8 | Comparative Example 9 |
|---|---|---|---|---|---|---|---|---|
| Item number of resin used |  |  |  | W101 | | | | |
| Melt viscosity (MFR) |  |  |  | 8–10 | | | | |
| Conditions of extruder | Extrusion rate (kg/hr) |  |  | 13.5 | 10.00 | 12.0 | 12.5 | 13.1 |
|  | Set temperature (° C.) | C1 portion |  | 145 | 145 | 145 | 145 | 145 |
|  |  | C2 portion |  | 176 | 175 | 175 | 175 | 175 |
|  |  | C3 portion |  | 175 | 175 | 175 | 175 | 175 |
|  |  | C4 portion |  | 170 | 170 | 170 | 170 | 170 |
|  |  | C5 portion |  | 168 | 168 | 168 | 168 | 168 |
|  |  | HD portion |  | 169 | 165 | 165 | 165 | 162 |
|  |  | D1 portion |  | 167 | 163 | 163 | 163 | 160 |
|  |  | D2 portion |  | 165 | 160 | 160 | 160 | 157 |
|  |  | LP portion |  | 165 | 160 | 160 | 160 | 157 |
|  | Rotation speed of screw (rpm) |  |  | 45.1 | 46.8 | 46.5 | 46.9 | 47.7 |
|  | Resin feeding pressure (kgf/cm$^2$) | P3 |  | 150 | 164 | 165 | 147 | 124 |
|  |  | P4 |  | 32 | 52 | 44 | 17 | 15 |
| Gas feeding conditions | Gas feeding pressure (kgf/cm$^2$) | P1 |  | 58 | 58 | 54 | 60 | 62 |
|  |  | P2 |  | 93 | 54 | 85 | 66 | 56 |
|  | Gas feeding rate | g/hr |  | 120 | 120 | 120 | 120 | 375 |
|  |  | PHR |  | 0.89 | 1.20 | 1.00 | 0.96 | 2.86 |
| Resin temperature (at exit of mold) (° C.) |  |  |  | 178 | 175 | 177 | 172 | 171 |
| Shape of mold lip | Model (FIG 4) |  |  | (C3) | (D) | (A) | (C2) | (B) |
|  | L(mm) |  |  | 0.20 | 0.30 | 0.35 | 0.72 | 1.50 |
|  | tan θ |  |  | 0.15 | 0.08 | 0.08 | 0.15 | 0.08 |
|  | T(mm) |  |  | 17 | 32 | 32 | 19 | 32 |
|  | tan θ |  |  | 0.95 | 0.08 | 0.08 | 0.95 | 0.08 |
| Hauling rate (m/min) |  |  |  | 1.6 | 1.4 | 1.4 | 0.8 | 0.8 |
| Measured values | Expansion ratio P (average of three points) |  |  | 2.8 | 3.7 | 3.6 | 2.2 | 1.6 |
|  | Resin feeding pressure | H (kgf/cm$^2$) |  | 150 | 164 | 165 | 147 | 124 |
|  |  | X |  | 802 | 944 | 938 | 731 | 591 |
|  |  | Y |  | 786 | 923 | 920 | 714 | 541 |
| Rating | Expansion ratio |  |  | Δ | Δ | Δ | X | X |
|  | Appearance |  |  | Δ(*) | Δ(*) | Δ(*) | ○ | ○ |
|  | Overall rating |  |  | ○ | ○ | ○ | X | X |

(*) There were some streaks

3 Extruder
4 Mold
5 Lip (LP)
6 Inner mandrel
7 Gas cylinder
8 Pump
9 Air ring
10 Haul off machine
23 Hopper of extruder
34 Head (HD)
82 Gas feeding opening
P1 Gas cylinder pressure gauge
P2 Gas feeding pressure gauge
P3 Resin feeding pressure gauge
P4 Lip pressure gauge

What is claimed is:

1. A method for producing a foamed resin article comprising a melting step of feeding a thermoplastic resin into an extruder and heating it to melt, a kneading step of mixing an inorganic gas with the thermoplastic resin in the extruder to produce a kneaded material, and a foaming step of discharging the kneaded material from a mold having a tubular channel mounted to the end of the extruder to form the foamed article, wherein extrusion molding is carried out within the range where a numeric X, which is defined by the following expression:

$$X = 100P + 3.5H$$

where a resin feeding pressure of the thermoplastic resin from the extruder to the mold is represented by H (kgf/cm$^2$) and an expansion ratio is represented by P, and the resin feeding pressure H satisfy the following expressions simultaneously:

$$780 \leq X \leq 4000,$$

and $$80 \leq H \leq 1000,$$

wherein a numeric Y, which is defined by the following expression:

$$Y = 100P + 3.5(H - 10G)$$

where the amount of the inorganic gas supplied to 100 g of the thermoplastic resin is represented by G g, satisfies the following expression:

$$760 \leq Y \leq 4000,$$

wherein the mold comprises a tubular channel having a tip (lip) with a shape that satisfies the following expressions simultaneously:

$$0.1 \leq L \leq 1;$$

$$0.1 \leq \tan \theta \leq 6;$$

and $$5 \leq T \leq 500$$

where a lip gap, a taper angle, and a taper land are represented by L (mm), θ, and T (mm), respectively.

2. The method of producing a foamed resin article according to claim 1, wherein, as for the shape of the tip (lip) of the mold having a tubular channel, an angle α which is formed by a center axis of the core of the lip and the taper land satisfies the following expression:

$$0.1 \leq \tan \alpha \leq 6.$$

3. The method for producing a foamed resin article according to claim 1, wherein the thermoplastic resin is a propylene-based polymer.

4. A method for producing a foamed resin article comprising a melting step of feeding a thermoplastic resin into an extruder and heating it to melt, a kneading step of mixing an inorganic gas with the thermoplastic resin in the extruder to produce a kneaded material, and a foaming step of discharging the kneaded material from a mold having a tubular channel mounted to the end of the extruder to form the foamed article, wherein extrusion molding is carried out within the range where a numeric X, which is defined by the following expression:

$$X = 100P + 3.5H$$

where a resin feeding pressure of the thermoplastic resin from the extruder to the mold is represented by H (kgf/cm$^2$) and an expansion ratio is represented by P, and the resin feeding pressure H satisfy the following expressions simultaneously:

$$780 \leq X \leq 4000,$$

and $$80 \leq H \leq 1000,$$

wherein a numeric Y, which is defined by the following expression:

$$Y = 100P + 3.5(H - 10G)$$

where the amount of the inorganic gas supplied to 100 g of the thermoplastic resin is represented by G g, satisfies the following expression:

$$760 \leq Y \leq 4000,$$

wherein the mold comprises a tubular channel having a tip (lip) with a shape that satisfies the following expressions simultaneously:

$$0.1 \leq L \leq 1;$$

$$0.1 \leq \tan \theta \leq 6;$$

and $$5 \leq T \leq 500,$$

where a lip gap, a taper angle, and a taper land are represented by L (mm), θ, and T (mm), respectively, wherein the thermoplastic resin is a propylene-based polymer, wherein the propylene-based polymer is a polymer which is obtained by continuous production comprising polymerizing, in the first stage, monomers mainly composed of propylene to produce a crystalline propylene-based polymer (A) having a limiting viscosity of 5 dl/g or more and successively polymerizing, in the second stage, monomers mainly composed of propylene to produce a crystalline propylene-based polymer (B) having a limiting viscosity of less than 3 dl/g and which is composed of the crystalline propylene-based polymer (A) and the crystalline propylene-based polymer (B) wherein a content of the polymer (A) is in the range of 0.05% by weight or more and less than 35% by weight, a limiting viscosity of the whole polymer is less than 3 dl/g, and Mw/Mn is less than 10.

5. The method for producing a foamed resin article according to claim 4, wherein the propylene-based polymer satisfies the following expression:

$$W_A \geq 400 \times EXP(-0.6(\eta_A))$$

where $[\eta_A]$ (dl/g) is the limiting viscosity of the crystalline propylene-based polymer (A) and $W_A$ (% by weight) is the crystalline propylene-based polymer (A) content in the whole polymer.

6. The method for producing a foamed resin article according to claim 4, wherein, the propylene-based polymer is composed of the crystalline propylene-based polymer (A) and the crystalline propylene-based polymer (B), each of them being a propylene homopolymer, a random copolymer of propylene and 10% by weight or less of ethylene, a random copolymer of propylene and 30% by weight or less of butene, or a random terpolymer of propylene, 10% by weight or less of ethylene and 30% by weight or less of butene.

7. The method for producing a foamed resin article according to claim 6, wherein, as for the propylene-based polymer, the crystalline propylene-based polymer (A) has a limiting viscosity ($\eta_A$) of 7 dl/g or more.

8. The method for producing a foamed resin article according to claim 6, wherein, as for the propylene-based polymer, the crystalline propylene-based polymer (A) contains ethylene, as a comonomer, in a proportion of 1% by weight or more and 10% by weight or less.

9. The method for producing a foamed resin article according to claim 6, wherein the propylene-based polymer is one produced continuously by a production method wherein a catalyst containing Ti, Mg and halogen as essential components is used, the polymerization rate of the crystalline propylene-based polymer (A) in the first step is 2000 g or more per gram of the catalyst per hour and the polymerization rate of the crystalline propylene-based polymer (B) in the second step is 4000 g or more per gram of the catalyst per hour.

10. The method for producing a foamed resin article according to claim 4, wherein, as for the propylene-based polymer, the crystalline propylene-based polymer (A) has a limiting viscosity $[\eta_A]$ of 7 dl/g or more.

11. The method for producing a foamed resin article according to claim 10, wherein, as for the propylene-based polymer, the crystalline propylene-based polymer (A) contains ethylene, as a comonomer, in a proportion of 1% by weight or more and 10% by weight or less.

12. The method for producing a foamed resin article according to claim 10, wherein the propylene-based polymer is one produced continuously by a production method wherein a catalyst containing Ti, Mg and halogen as essential components is used, the polymerization rate of the crystalline propylene-based polymer (A) in the first step is 2000 g or more per gram of the catalyst per hour and the polymerization rate of the crystalline propylene-based polymer (B) in the second step is 4000 g or more per gram of the catalyst per hour.

13. The method for producing a foamed resin article according to claim 4, wherein, as for the propylene-based polymer, the crystalline propylene-based polymer (A) contains ethylene, as a comonomer, in a proportion of 1% by weight or more and 10% by weight or less.

14. The method for producing a foamed resin article according to claim 13, wherein the propylene-based polymer is one produced continuously by a production method wherein a catalyst containing Ti, Mg and halogen as essential components is used, the polymerization rate of the crystalline propylene-based polymer (A) in the first step is 2000 g or more per gram of the catalyst per hour and the polymerization rate of the crystalline propylene-based polymer (B) in the second step is 4000 g or more per gram of the catalyst per hour.

15. The method for producing a foamed resin article according to claim 4, wherein the propylene-based polymer is one produced continuously by a production method wherein a catalyst containing Ti, Mg and halogen as essential components is used, the polymerization rate of the crystalline propylene-based polymer (A) in the first step is 2000 g or more per gram of the catalyst per hour and the polymerization rate of the crystalline propylene-based polymer (B) in the second step is 4000 g or more per gram of the catalyst per hour.

16. A method for producing a foamed resin article comprising a melting step of feeding a thermoplastic resin into an extruder and heating it to melt, a kneading step of mixing an inorganic gas with the thermoplastic resin in the extruder to produce a kneaded material, and a foaming step of discharging the kneaded material from a mold having a tubular channel mounted to the end of the extruder to form the foamed article, wherein extrusion molding is carried out within the range where a numeric X, which is defined by the following expression:

$$X = 100P + 3.5H$$

where a resin feeding pressure of the thermoplastic resin from the extruder to the mold is represented by H (kgf/cm$^2$) and an expansion ratio is represented by P, and the resin feeding pressure H satisfy the following expressions simultaneously:

$$780 \leq X \leq 4000,$$

and $$80 \leq H \leq 1000$$

wherein a numeric Y, which is defined by the following expression:

$$Y = 100P + 3.5(H - 10G)$$

where the amount of the inorganic gas supplied to 100 g of the thermoplastic resin is represented by G g, satisfies the following expression:

$$760 \leq Y \leq 4000,$$

wherein the mold comprises a tubular channel having a tip (lip) with a shape that satisfies the following expressions simultaneously:

$$0.1 \leq L \leq 1;$$

$$0.1 \leq \tan\theta \leq 6;$$

and $$5 \leq T \leq 500,$$

where a lip gap, a taper angle, and a taper land are represented by L (mm), $\theta$, and T (mm), respectively, wherein the thermoplastic resin is a propylene-based polymer selected from the group consisting of propylene homopolymer and copolymers of propylene with ethylene or α-olefin, wherein a content of monomer other than propylene is 10% by weight or less for ethylene and 30% by weight or less for α-olefin.

* * * * *